United States Patent [19]

Macbeth

[11] 3,946,557
[45] Mar. 30, 1976

[54] ROCKET MOTOR CONSTRUCTION

[75] Inventor: Albert William Macbeth, Brigham City, Utah

[73] Assignee: Thiokol Corporation, Newtown, Pa.

[22] Filed: July 19, 1974

[21] Appl. No.: 489,961

[52] U.S. Cl. ............ 60/253; 60/255; 60/271; 89/1 R; 102/49.8; 220/226; 220/232
[51] Int. Cl.² .................................... F02K 9/04
[58] Field of Search ............ 60/253, 255, 254, 271; 102/103, 49.3, 49.8; 220/233, 239, 226, 232; 215/233, 269, 270; 89/1 R; 239/265.11

[56] References Cited
UNITED STATES PATENTS

| | | | |
|---|---|---|---|
| 3,010,354 | 11/1961 | Adelman | 102/103 |
| 3,104,523 | 9/1963 | O'Donnell | 60/255 |
| 3,121,310 | 2/1964 | Rice | 60/253 |
| 3,243,956 | 4/1966 | Hamm et al. | 60/255 |
| 3,270,502 | 9/1966 | Silver | 60/255 |
| 3,372,548 | 3/1968 | Mathis et al. | 239/265.11 |
| 3,426,528 | 2/1969 | Mangum et al. | 60/255 |
| 3,446,018 | 12/1966 | Macbeth | 102/103 X |
| 3,583,162 | 6/1971 | Neely | 60/255 |

*Primary Examiner*—Carlton R. Croyle
*Assistant Examiner*—Robert E. Garrett
*Attorney, Agent, or Firm*—Stanley A. Marcus; Edward E. McCullough; William R. Wright, Jr.

[57] ABSTRACT

Stresses induced by differential expansion and contraction of the solid propellant grain and the rocket motor case to which it is conventionally bonded are obviated by bonding a special sheath to the propellant grain and attaching it to the rocket motor case only at its forward and aft ends. A thin layer of Teflon is confined intermediately between the sheath and the rocket motor case. The sheath is extended beyond the propellant grain and bonded to the case so that an unbonded section thereof extends between the zone at which it is bonded to the case and the propellant grain. The propellant grain joins the sheath by a surface fillet to relieve surface stresses at this juncture. A gastight seal is provided in the thrust nozzle of the rocket motor for pressurizing of the combustion chamber to inhibit radial shrinkage of the propellant.

2 Claims, 2 Drawing Figures

ROCKET MOTOR CONSTRUCTION

This invention was made under or during the course of Contract Number N0003072C0062 with the U.S. Navy.

CROSS REFERENCE TO RELATED APPLICATIONS

This invention is somewhat related to that described in my co-pending application titled "Rocket Motor Construction,"Ser. No. 413,477, filed Nov. 7, 1973.

BACKGROUND OF THE INVENTION

This invention relates broadly to rocket motor construction. More specifically, it relates to means for mounting solid propellant grains in rocket motor cases so that stresses induced by propellant shrinkage or differential thermal expansion or contraction thereof relative to the case are obviated.

A continuing problem with solid propellant rocket motors, particularly those of the end-burning type, is that most solid propellants tend to shrink during the curing process, and also tend to contract to a much greater extent than the rocket motor case to which they are bonded during the subsequent cooling period. The primary problem in such mounting means is to provide for axial motion of the propellant grain relative to the case and at the same time prevent ignition of the sides of the propellant during rocket motor operation. Conventional means of obviating these stresses have included the use of a plurality of layers of insulation surrounding the propellant grain. These layers are bonded together and to the case of the rocket only at the forward end thereof to permit longitudinal movement of the propellant grain relative to the case as it shrinks or expands. This method tends to add an unacceptable amount of inert weight to the rocket and to diminish the quantity of propellant that can be loaded therein. My previous invention cited above as a related application, and over which the present invention is considered an improvement, treated this problem by bonding a series of overlapping hoops to the propellant grain and to the case in such a way that a series of longitudinal expansion joints were created. Although this is a useful invention, the present invention is much lighter in weight of inert parts.

SUMMARY OF THE INVENTION

The present invention, which overcomes these difficulties of prior art rocket motor constructions and fills the needs for longitudinal movement of the propellant grain relative to the rocket case and of preventing ignition of the sides of the propellant grain, comprises a gastight seal in the throat of the thrust nozzle and a special sheath that surrounds the propellant grain inside the motor case. The sheath is made of elastomer. A thin layer of Teflon is confined between the elastomeric sheath and the rocket motor case. The elastomeric sheath is extended beyond its juncture with the propellant grain and is bonded to the case such that an unbonding section thereof exists between propellant grain and the zone at which the sheath is bonded to the case. The propellant grain is joined to this unbonded section by a fillet to obviate surface stresses in the propellant.

Objects of the invention are to provide a rocket motor construction that: (1) Permits longitudinal motion of the propellant grain relative to the case to which it is attached; (2) Prevents ignition of the sides of the propellant grain during rocket motor operation; and (3) Does not impart an unacceptable amount of inert weight to the rocket motor.

Important features of the invention are that it is simple to manufacture and reliable in operation.

Other objections and advantages of the invention may be noted as a following detailed description is read with reference to the accompanying drawing. The same parts are designated by the same numerals throughout the disclosure.

DESCRIPTION OF THE PREFERRED EMBODIMENTS

Figure 1:
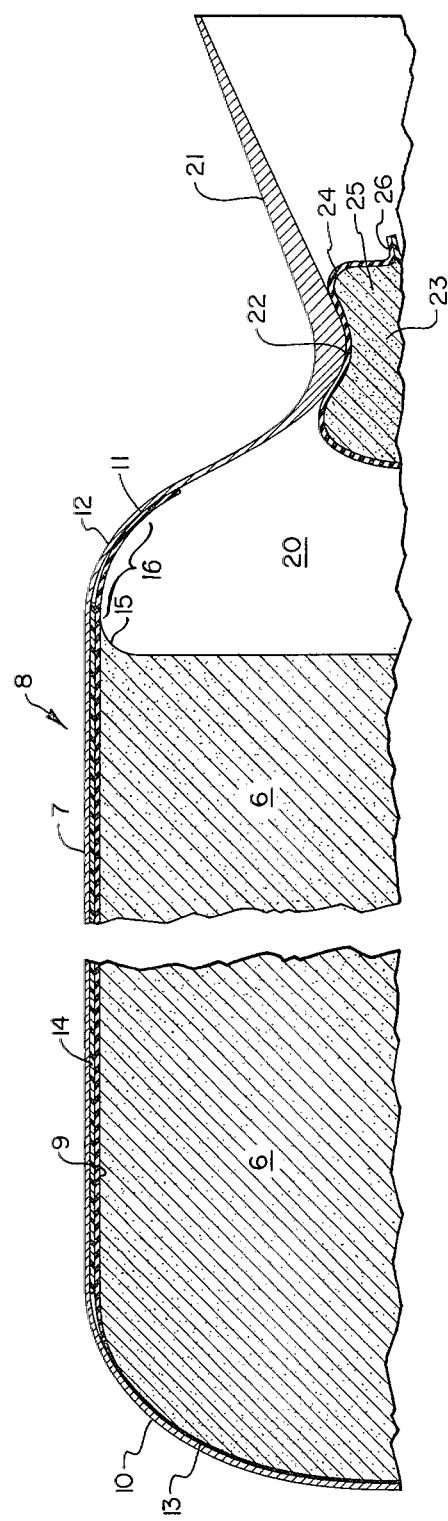
FIG. 1 is a partial, longitudinal section of the invention.

As shown in the FIGS., the invention is a means for mounting a solid propellant grain 6 in a case 7 of a rocket motor 8 so that stresses caused by differential contraction or expansion between the propellant 6 and the case 7 are obviated; and so that ignition of the sides of the propellant grain 6 is prevented. The propellant grain 6 is bonded to an elastomeric sheath 9 that is essentially cylindrical and extends from the forward end dome 10 to a zone 11 beyond the point of tangency with the aft dome 12. The propellant grain 6 is bonded to the case 7 by an adhesive 13 at the forward dome 10. A cylindrical layer 14 of Teflon (polytetrafluoroethylene) is bonded to the outside of the sheath 9 between the sheath and the case 7. The propellant grain 6 is typically of the end-burning type and joins the sheath 9 at its aft surface by a fillet 15 to avoid surface stresses in the propellant.

Figure 2:
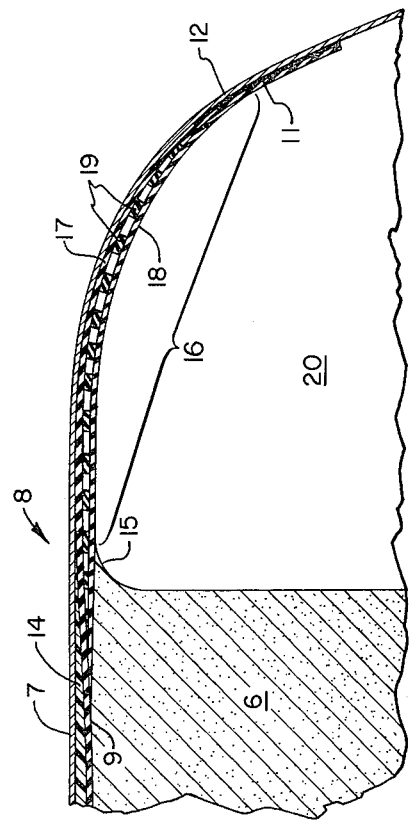
FIG. 2 is an enlarged portion therof.

The sheath 9 is bonded to the case 7 at the zone 11, which lies aft of the propellant grain 6, so that there is an unbonded annular section 16 that lies between the propellant grain 6 and the attachment of the sheath 9 to the case 7. Since this unbonded zone 16 is typically under tension as the propellant grain 6 shrinks in an axial direction during its curing process, it must be capable of considerable elasticity. As shown in FIG. 2, this unbonded section is preferably made of two parallel layers 17 and 18 spaced apart by elastomeric hoops 19 that are fixed to at least one of the elastomeric layers 17 or 18. This combination of the hoops 19 with a layer 17 or 18 may be made either by extrusion or by bonding the hoops to one or both layers. Although hoops are preferred for the spacers 19, they may be made of any of a variety of other configurations, such as disks, squares, etc.

Especially during the curing process of the propellant 6, it is desirable to minimize any radial shrinkage thereof. This may be accomplished by maintaining gas pressure in the combustion chamber 20, thereby providing a pressure against the surface of the propellant that will act against the vacuum between the sheath 9 and the rocket motor case 7. This gas pressurization is made possible by sealing the rocket motor nozzle 21 at the throat 22 thereof by a plug 23. This plug 23 is formed by filling an elastomeric bag 24 with a plastic foam 25 that may be foamed and cured in situ to conform to the contour of the throat 22. After the foam has set, the bag 24 is sealed at 26.

Ordinarily, the pressurization is not more than one atmosphere. However, if greater pressure is desired, additional gas may be introduced into the combustion chamber 20 via a small tube, not shown, that may be inserted through the plug 23 and then sealed after sufficient pressure has been introduced.

The plug 23 formed in this manner maintains combustion chamber pressure very well as the unfired missile is transported to various altitudes and environments. However, upon firing of the missile, the thin elastomeric bag and plastic foam 25 are quickly disintegrated and expelled by the hot propulsive gases produced by the burning propellant 6. Although any of a number of plastic foam materials may be used for this purpose, the preferred material is a polyurethane, because of its relative imperviousness to humidity and temperature changes.

In some applications, the unbonded section 16 of the sheath 9 may be simply an extension of the single layer of elastomer that comprises the sheath 9. However, in large rocket motors wherein the aft surface of the propellant 6 may move through a considerable distance, and wherein considerable weight of propellant is involved, the added strength of the double sheath section 16 described above is desired.

An invention has been described that advances the art of solid propellant rocket motor construction. Although the embodiment has been described with specificity regarding detail, it should be noted that many details may be altered without departing from the scope of the invention as it is defined in the following claims.

The invention claimed is:
1. A gastight seal for a convergent-divergent rocket thrust nozzle comprising:
   a thin, flexible, elastomeric bag in the throat portion of the nozzle; and
   a cured, plastic foam in the bag, the foam having been cast and cured in situ with sufficient foam to form a plug having an axially convergent-divergent surface conforming exactly to the surface of the nozzle throat.
2. The rocket motor of claim 1 wherein the plastic foam is a polyurethane.

* * * * *